United States Patent
Clevorn et al.

(10) Patent No.: US 11,789,569 B2
(45) Date of Patent: Oct. 17, 2023

(54) PHYSICAL CONTROL DEVICE FOR TOUCHSCREENS

(71) Applicant: Apple Inc., Cupertino, CA (US)

(72) Inventors: Thorsten Clevorn, Munich (DE); Stefan Meyer, Höchstadt (DE)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/049,219

(22) Filed: Oct. 24, 2022

(65) Prior Publication Data

US 2023/0145244 A1 May 11, 2023

Related U.S. Application Data

(60) Provisional application No. 63/263,808, filed on Nov. 9, 2021.

(51) Int. Cl.
*G06F 3/044* (2006.01)
*G06F 3/01* (2006.01)
*G06F 3/041* (2006.01)

(52) U.S. Cl.
CPC .............. *G06F 3/044* (2013.01); *G06F 3/016* (2013.01); *G06F 3/0412* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 10,516,208 B2 | 12/2019 | Lee et al. | |
| 10,769,512 B2 | 9/2020 | Benkley et al. | |
| 10,803,281 B2 | 10/2020 | Han et al. | |
| 10,916,363 B2 | 2/2021 | Lauder et al. | |
| 2018/0024649 A1* | 1/2018 | Uno | G06F 3/0338 345/174 |
| 2018/0081534 A1 | 3/2018 | Jeong et al. | |
| 2018/0373351 A1* | 12/2018 | Sawada | H01H 19/005 |

* cited by examiner

*Primary Examiner* — Stephen T. Reed
(74) *Attorney, Agent, or Firm* — Kubota & Basol LLP

(57) ABSTRACT

A method of communicating between a physical control device and an electronic device is disclosed herein, the physical control device having a plurality of conductive protrusions detectable by a touch screen of the electronic device when placed in contact with the touch screen. The method comprises identifying, via the electronic device, the physical control device in contact with the touch screen based on a conductive pattern of the conductive protrusions detected by a capacitive touch sensor panel of the touch screen. The method further includes performing a first action at the electronic device in accordance with an input to the physical control device that causes a change in a characteristic of the conductive pattern of the plurality of conductive protrusions detected by the capacitive touch sensor panel, and ignoring a touch input at the capacitive touch sensor panel from a housing of the physical control device.

22 Claims, 8 Drawing Sheets

PHYSICAL CONTROL DEVICE FOR TOUCHSCREENS

CROSS REFERENCE TO RELATED APPLICATIONS

This application claims the benefit of U.S. Provisional Application No. 63/263,808, filed Nov. 9, 2021, the contents of which are incorporated herein by reference in their entirety for all purposes.

FIELD OF THE DISCLOSURE

This relates generally to physical control devices for use with an electronic device having a touch sensor panel and/or touch screen, and more specifically to communication between a physical control device and an electronic device having a capacitive touch sensor panel and/or touch screen using conductive protrusions of the physical control device.

BACKGROUND OF THE DISCLOSURE

Touch sensor panels, touch screens, and the like are widely available as input devices. Touch screens, in particular, are popular due to their ease and versatility of operation as well as their declining price. Touch screens are found in various types of electronic devices such as mobile phones, portable music players, cameras, global positioning systems (GPS), and tablet personal computers (PC), and in recent years have been expanding to all aspects of life such as checking in at an office or ordering food from a vending machine or at a restaurant/cafe.

Typically, touch data captured by a touch panel of an electronic device can be used to determine the location, the contact area, and in some cases even the force of the one or more touches detected by the touch screen. The touch data can be then interpreted by a processor to perform various operations on the electronic device. This touch data is typically inputted by a user's finger(s), a stylus, or the like. However, there are some instances where finger or stylus interactions with touch screen interactions may be less suited. For example, finger and stylus input may be difficult where a user cannot commit full concentration on the screen (e.g., while performing another task that diverts attention away from the touch screen). Additionally, there are some instances where precise input movements are not ideal or possible using touch gestures (e.g., rotation of a knob or dial). Furthermore, there are some instances where a user would prefer not to interact directly with a public touchscreen for hygienic reasons or when a user is concerned about privacy (e.g., improper acquisition of passcodes or biometric information, such as a fingerprint).

SUMMARY OF THE DISCLOSURE

Physical control devices for use with an electronic device having a touch sensor panel and/or touch screen and a method of communicating information between a physical control device and an electronic device including a touch screen are disclosed herein. The physical control device can have a housing and a plurality of conductive protrusions detectable by a capacitive touch sensor panel of the touch screen when the physical control device contacts the touch screen. The method can comprise identifying, using processing circuitry of the electronic device, the physical control device in contact with the touch screen based on a conductive pattern of the plurality of conductive protrusions detected by the capacitive touch sensor panel. The method can further comprise performing a first action at the electronic device in accordance with an input to the physical control device that causes a change in a characteristic of the conductive pattern of the plurality of conductive protrusions detected by the capacitive touch sensor panel, and ignoring a touch input at the capacitive touch sensor panel from the housing of the physical control device in contact with the touch screen. The method can further comprise in response to the identifying the physical control device in contact with the touch screen, establishing a bi-directional communication link between the physical control device and the electronic device including the touch screen.

DETAILED DESCRIPTION

Figure 1A:
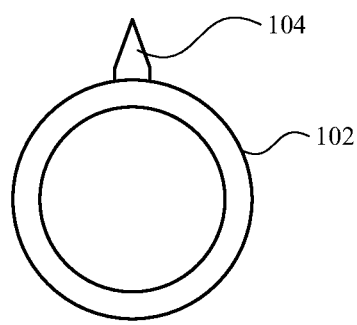
FIG. 1A-1C illustrate example physical control devices according to examples of the disclosure.

In the following description of examples, reference is made to the accompanying drawings which form a part hereof, and in which it is shown by way of illustration specific examples that can be practiced. It is to be understood that other examples can be used, and structural changes can be made without departing from the scope of the disclosed examples.

This relates to physical control devices for use with an electronic device having a touch sensor panel and/or touch screen, and to communication between a physical control device and an electronic device having a capacitive touch sensor panel and/or touch screen using conductive protrusions of the physical control device. For ease of description, the electronic device including the touch sensor panel or touch screen can be referred to herein simply as a touch screen. The device including conductive protrusions can be referred to herein as the physical control device. As such, this disclosure generally relates to a self-contained physical control extension of a touch screen that may require no additional communication technology (e.g., no dedicated Bluetooth or WiFi communication channel) to communicate with the touch screen, and that can be capable of being connected to various electronic touch screens that may or may not include dedicated communication technology besides a touch screen. In particular, the physical control device can be capable of identification and initiating operations with the touch screen through use of conductive protrusions. In some examples, the conductive protrusions can be located on a housing of the physical control device and can be configured to identify the physical control device to the touch screen. In some examples, the touch screen can include a touch sensor panel capable of detecting a pattern of the conductive protrusions such that processing circuitry of the touch sensor panel can identify the physical control device.

Once identified as being coupled to the touch screen, the physical control device can be enabled to act as an extension of the touch screen in various ways. In some examples, a user can perform an action at the physical control device that cause changes in the conductive pattern of the one or more of the conductive protrusions detected by the touch sensor panel (e.g., by movement of the conductive protrusions). In this way, the conductive protrusions can serve as an input channel for transmitting information from the physical control device to the touch screen. For example, the touch sensor panel can be configured to detect a change in a characteristic of the conductive pattern of the conductive protrusions and perform an action at the touch screen in accordance with the change.

In some examples, and to accomplish the above, the physical control device can be placed in contact with or in close proximity to the touch screen, with the conductive protrusions facing the touch screen. In this way, the touch screen can capture a touch image corresponding to the pattern of the conductive protrusions of the physical control device. Based on the detected pattern, processing circuitry of the touch screen can be configured to identify the physical control device. Furthermore, and as discussed above, the touch screen can be configured to receive information from the physical control device based on the manipulation of the conductive protrusions. In particular, the processing circuitry can be configured to perform an action at the touch screen in accordance with an input to the physical control device that causes a change in a characteristic of the conductive pattern of the conductive protrusions. In some examples, the physical control device can be enabled to receive information from the touch screen, such as by scanning an encoded image to receive information from the touch screen. In this way, a bi-directional communication link can be established between the physical control device and the electronic device of the touch screen. These and other features are discussed in greater detail hereinafter.

Figure 1B:
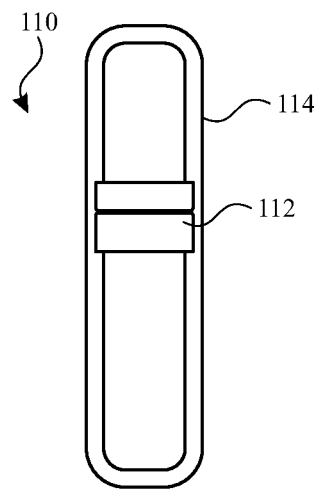
Figure 1C:
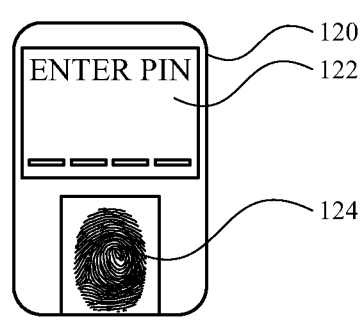

FIGS. 1A-1C illustrate example physical control devices according to examples of the disclosure. FIG. 1A illustrates an example knob 102 that optionally includes a pointer 104. Knob 102 can couple to a touch screen and establish a unidirectional or bi-directional communication therewith. In some examples, as discussed in greater detail herein, knob 102 can be configured to be communicatively coupled to an electronic device through a touch screen of the electronic device such that a rotation input of knob 102 (e.g., when pointer 104 move as knob 102 rotates) can be received by the touch screen as input and the input can cause an action by the electronic device in response to the input. In some examples, information can be displayed on the user interface of the touch screen around knob 102 (e.g., upon detecting knob 102 contacting the touch screen). In some examples, the user interface can change when knob 102 moves. For instance, information around knob 102 could include information describing the temperature for a heating ventilation or air conditioning (HVAC) system (e.g., in a room, vehicle, etc.). Placement of knob 102 on the touch screen can cause the touch screen to display a temperature scale around a portion of the knob. In some examples, a position of pointer 104 can correspond to a current target temperature for the HVAC system. In some examples, when a user moves knob 102 (e.g., rotating the knob), the target temperature for the HVAC system controlled by the electronic device can be adjusted (e.g., a level of heating/air conditioning could be turned up or down). It should be understood that the knob-type physical control device can be used for other types of input. For example, a knob-type physical control device can be used for adjusting other aspects of the electronic device or another electronic device in communication with the electronic device including the touch screen. For example, a knob-type physical control device can be used for adjusting the volume or other audio characteristics of audio input/output devices, adjusting brightness, contrast, etc. of a display, adjusting size, position, or orientation of objects displayed on the display, adjusting the magnitude of haptic feedback, etc.

FIG. 1B illustrates an example slider 110 that can include a sliding lever 112 and a sliding track 114 that can couple to a touch screen. The slider 110 can establish a unidirectional or a bi-directional communication with the touch screen. In some examples, as discussed in greater detail herein, slider 110 can be configured to be communicatively coupled to a touch screen such that when the sliding lever 112 of slider 110 moves within sliding track 114, the touch screen can receive the sliding input and cause an action by the electronic device in response to the sliding input. For instance, a user can slide sliding lever 112 up or down to control audio characteristics in an audio mixing application. In some examples, information can be displayed on the user interface of the touch screen around slider 110 (e.g., upon detecting slider 110 contacting the touch screen). In some examples, the user interface can change when sliding lever 112 moves. For instance, information around slider 110 could include information describing the volume level for audio playback for the electronic device. Placement of slider 110 on the touch screen can cause the touch screen to display a volume scale around a portion of the slider. In some examples, a position of sliding lever 112 can correspond to a current volume level. It should be understood that the slider-type physical control device can be used for other types of input (e.g., adjusting the volume or other audio characteristics of audio input/output devices, adjusting brightness, contrast, etc. of a display, adjusting magnitude of haptic feedback, etc.).

FIG. 1C illustrates an example control device 120 that includes a touch screen 122 and/or a fingerprint sensor 124 (or other biometric authentication sensors. Control device 120 can couple to a touch screen of an electronic device and establish a unidirectional or bi-directional communication with the touch screen. In some examples, as discussed in greater detail herein, control device 120 can be configured to be communicatively coupled to a touch screen such that touch input to touch screen 122 or fingerprint input to fingerprint sensor 124 can be received by the touch screen of an electronic device, and cause an action by the electronic device in response to the touch input and/or fingerprint input. For example, a user can input identifying information, such as a pin to touch screen 122 of control device 120, and the electronic device can receive the pin or an alternative authentication from the control device 120 using the touch screen. Additionally or alternatively, a user may place their fingerprint on fingerprint sensor 124, and the electronic device can receive the finger or an alternative authentication from the control device using the touch screen. In some examples, information can be displayed on the user interface of the touch screen can be modified in response to placement of the control device 120 on the touch screen and or in response to input to the control device 120. In particular, and as noted above, upon coupling of control device 120 to touch screen 122, a bi-directional communication can be established. This bi-directional communication link can act as a secure communication connection between control device 120 and touch screen 122 encoding the information in the pattern of protrusions of the control device and/or using encoded images on the touch screen visible to the physical control device (e.g., that are not visible on the touch screen when the physical control device is removed). As such, the user can be identified in a secure way (e.g., user's fingerprint can be identified via fingerprint sensor 124) and/or the user can interact in a secure way using secure communications between the physical control device and the electronic device include the touch screen. As explained in further detail herein, this communication between physical control device 120 and touch screen 122 can enable user authentication and/or other user interactions via physical control device 120.

It should be understood that the touch/fingerprint-input-type physical control device can be used for other types of input beyond inputting a pin or fingerprint for authentication. For example, a physical control device may include input and/or output devices to provide an improved user experience (e.g., convenience, improved accessibility). In some examples, a physical control device may include a braille reader (e.g., a piezoelectric braille display) or braille enabled input device to improve accessibility for a visually impaired user. In some examples, a physical control device may include an audio playback feature (e.g., using a speaker) and/or voice control feature (e.g., using a microphone) to improve user experience for those with a visually impaired or motor impaired user. In some examples, the input/output devices can include special mechanical controls and/or provide a scanning interface with switch control for users with motor impairments. In this way, physical control devices can be personally suited to a user's needs without requiring any additional hardware (perhaps only software) for the electronic device including the touch screen to enable communication with the physical control device. In some examples, the input/output devices can include one or more buttons, a keypad, a keyboard, a trackball, a joystick, indicator lights, or any other suitable input/output device.

Figure 2A:
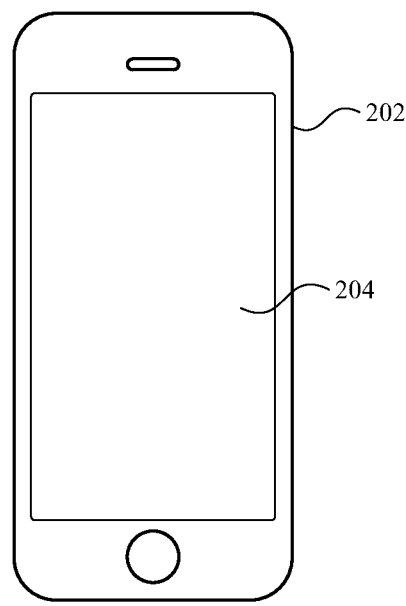
FIG. 2A-2C illustrates example electronic devices including touch screens and a block diagram of an example device including a touch screen according to examples of the disclosure.
Figure 2B:
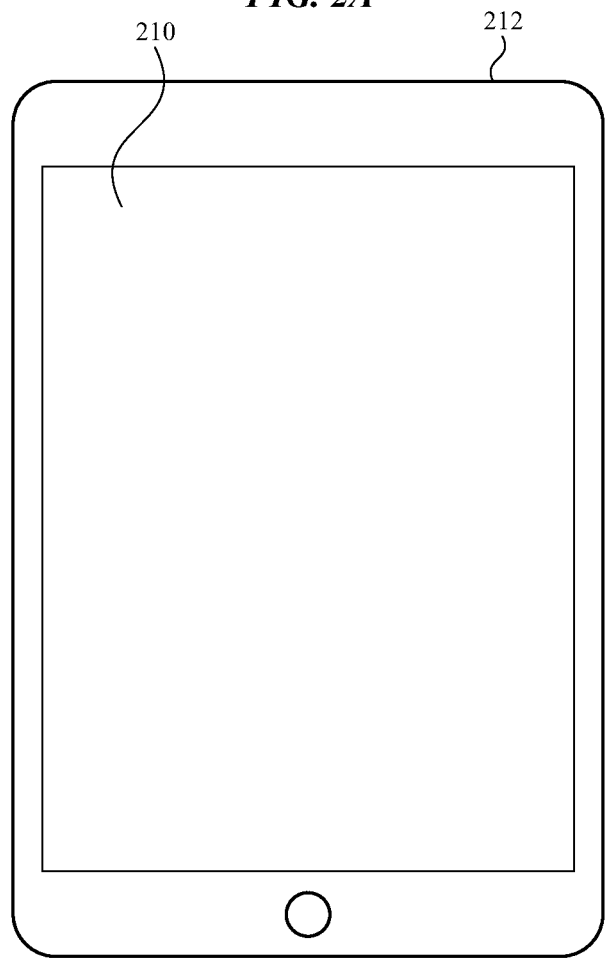

As described above, these and other example physical control devices can be used to communicate with various electronic devices using their touch screens. FIG. 2A-2B illustrates example touch screens according to examples of the disclosure. For instance, FIG. 2A illustrates an example mobile telephone 202 that includes a touch screen 204 that can detect a physical control device and can establish a unidirectional or bi-directional communication therewith. In examples, touch screen 204 can include a capacitive touch sensor panel. The capacitive touch sensor panel can be multi-touch enabled for detecting multiple touches from multiple objects (e.g., fingers) at the same time. Touch screen 204 can further include processing circuitry coupled to the touch screen configured to identify a physical control device. The processing circuitry can be further configured to perform an action at the electronic device based on certain touch inputs from the physical control device and ignore other touch inputs from the control device at the touch screen, as discussed herein.

FIG. 2B illustrates an example tablet computing device 212 that includes a touch screen 210 that can detect a physical control device and can establish unidirectional or a bi-directional communication therewith. In some examples, touch screen 210 can include a capacitive touch sensor panel. The capacitive touch sensor panel can be multi-touch enabled for detecting multiple touches from multiple objects (e.g., fingers) at the same time. Touch screen 210 can include processing circuitry coupled to the touch screen configured to identify a physical control device. The processing circuitry can be further configured to perform an action at the electronic device based on certain touch inputs from the physical control device and ignore other touch input at the touch screen, as discussed herein.

It is understood that although FIGS. 2A and 2B illustrate mobile telephone 202 and tablet computing device 212, that the electronic device including a touch screen can include other portable and non-portable electronic devices (e.g., laptop or desktop computers, servers, communication hubs, vending machines, vehicles, smartboards, wearable devices, etc.). Additionally, although described primarily as having a touch screen, some electronic devices may include a touch sensor panel without a display to enable a unidirectional communication from a physical control device.

Figure 2C:
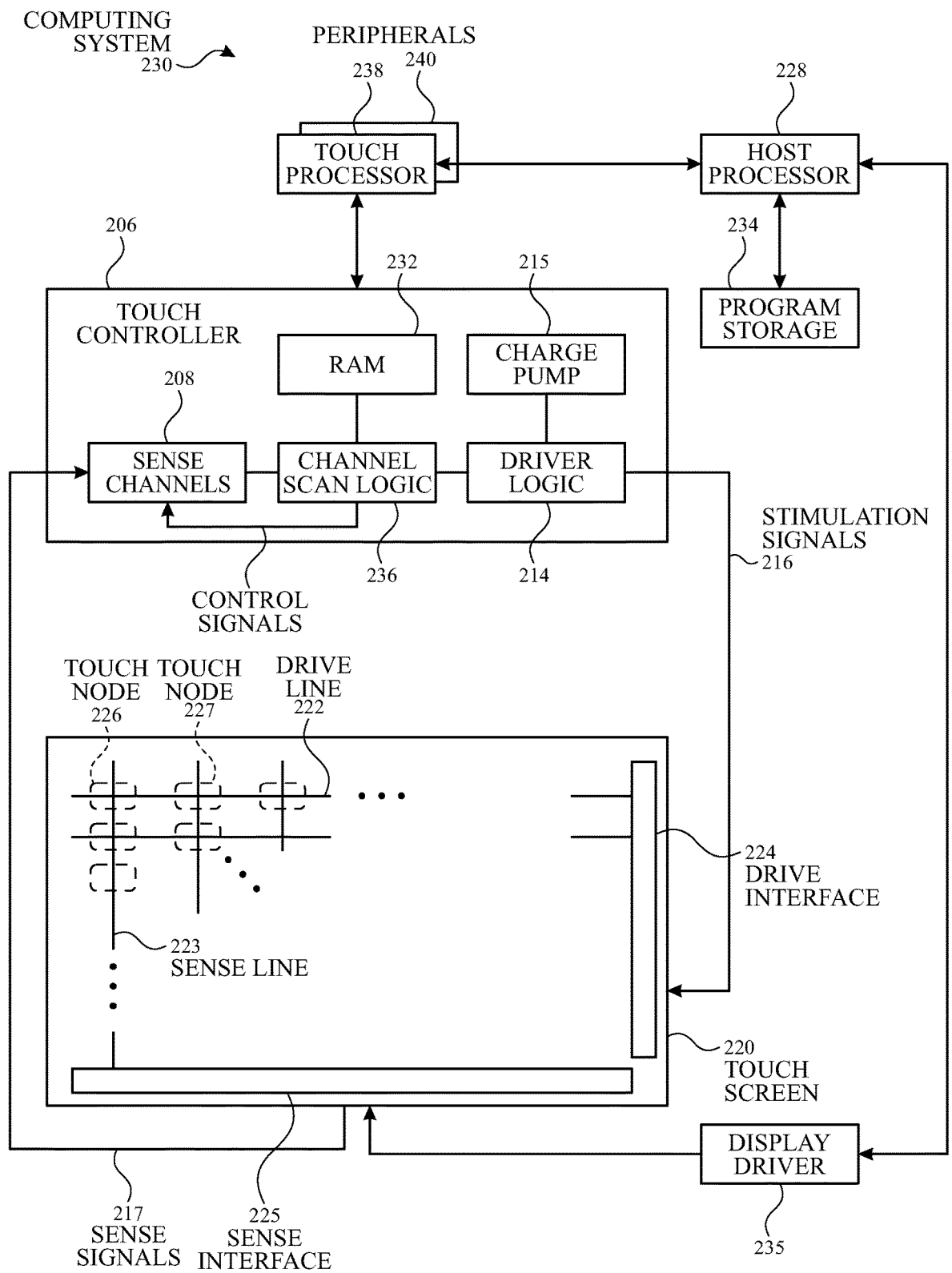

FIG. 2C illustrates an example block diagram of a computing system for an electronic device including a touch screen according to examples of the disclosure. It should be understood that the illustrated touch screen 220 (which includes a touch sensor panel) could instead be only a touch sensor panel. Computing system 230 can be included in any of the example electronic devices including touch screens shown in FIGS. 2A-2B, and for example, in a mobile phone, tablet, touchpad, portable or desktop computer, portable media player, wearable device or any mobile or non-mobile computing device that includes a touch screen or touch sensor panel. Computing system 230 can include a touch sensing system including one or more touch processors 238, peripherals 240, a touch controller 206, and touch sensing circuitry (described in more detail below). Peripherals 240 can include, but are not limited to, random access memory (RAM) or other types of memory or storage, watchdog timers and the like. Touch controller 206 can include, but is not limited to, one or more sense channels 208, channel scan logic 236 and driver logic 214. Channel scan logic 236 can access RAM 232, autonomously read data from the sense channels, and provide control for the sense channels. In addition, channel scan logic 236 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 238 and peripherals 240 can be integrated into a single application specific integrated circuit (ASIC), and in some examples can be integrated with touch screen 220 itself. The example computing system 230 of FIG. 2C can be configured to implement and perform any of the scans and comparisons described below.

It should be apparent that the architecture shown in FIG. 2C is only one example architecture of computing system 230, and that the system could have more or fewer components than shown, or a different configuration of components. The various components shown in FIG. 2C can be implemented in hardware, software, firmware, or any combination thereof, including one or more signal processing and/or application specific integrated circuits.

Computing system 230 can include a host processor 228 for receiving outputs from touch processor 238 and performing actions based on the outputs. For example, host processor 228 can be connected to program storage 234 and a display controller/driver 235 (e.g., a Liquid-Crystal Display (LCD) driver). It is understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 235 can provide voltages on select (e.g., gate) lines to each pixel transistor and can provide data signals along data lines to these same transistors to control the pixel display image.

Host processor 228 can use display driver 235 to generate a display image on touch screen 220, such as a display image of a user interface (UI), and can use touch processor 238 and touch controller 206 to detect a touch on or near touch screen 220, such as a touch input to the displayed UI. The touch input can be used by computer programs stored in program storage 234 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing. As described herein, the host processor can be used to detect a physical input device and to enable unidirectional or bidirectional communication between the device including the touch screen and the physical input device. For example, host processor 228 can use conductive patterns of the physical control device for downlink communications and can generate encoded images for uplink communications to the physical control device.

Note that one or more of the functions described in this disclosure can be performed by firmware stored in memory (e.g., one of the peripherals 240 in FIG. 2C) and executed by touch processor 238, or stored in program storage 234 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, or device. In some examples, RAM 232 or program storage 234 (or both) can be a non-transitory computer readable storage medium. One or both of RAM 232 and program storage 234 can have stored therein instructions, which when executed by touch processor 238 or host processor 228 or both, can cause the device including computing system 230 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport medium can include, but is not limited to, an electronic, magnetic, optical, electromagnetic, or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224 and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to driver logic 214 via drive interface 224 and sense lines 223 may be directly connected to sense channels 208 or indirectly connected to sense channels 208 via sense interface 225. In either case an electrical path for driving and/or sensing the touch nodes can be provided.

As described herein, a physical control device may be coupled to the touch screens in various ways. In some examples, the user may place the physical control device in contact with the touch screen. In some examples, the placement of the physical control device can be accompanied by mechanism to secure the physical control device to the touch screen. For example, a housing of the physical control device can be affixed on the touch screen using a coupling force that allows the housing of the physical control device to remain stationary on the touch screen. In some examples, a physical control device may be affixed to the touch screen through use of a magnetic or suction force. In some examples, even while the housing of the physical control device remains stationary with respect to the touch screen, a portion of the physical control device may be able to move as described herein. In some examples, the user may place the physical control device in close proximity to the touch screen (e.g., within a threshold distance of the touch electrodes). The physical control device and touch screen may interact in various ways, discussed in detail herein.

Figure 3A:
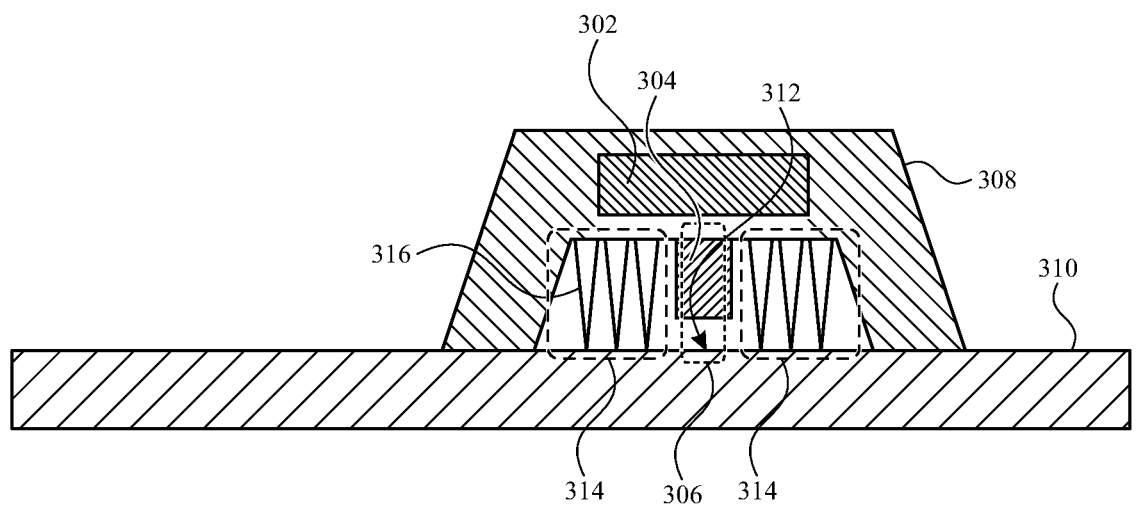
FIG. 3A illustrates a cross-sectional side view of an example physical control device coupled to a touch screen according to examples of the disclosure.

FIG. 3A illustrates a cross-sectional side view of an example physical control device 308 connected to a touch screen 310 according to examples of the disclosure. Physical control device 308 can represent an example of physical control devices corresponding to knob 102, slider 110, and/or control device 120 of FIGS. 1A-1C. Touch screen 310 can represent an example touch screen of an electronic device corresponding to touch screens 204, 210, and 220 of FIGS. 2A-2C. As shown in FIG. 3A, the side view of the physical control device includes control unit 302, imaging sensor 304, and conductive protrusions 316. As described herein, the conductive protrusions 316 can be used for downlink communication 314 between the physical control device 308 and the touch screen 310 and the imaging sensor 304 can be used for uplink communication 306 between the physical control device 308 and the touch screen 310, for example, by detecting an encoded image 312 displayed on the touch screen below imaging sensor 304.

Control unit 302 can be configured to coordinate input and output of the components of the physical control device. For example, control unit 302 can cause physical control device 308 to perform an action in accordance with detecting an encoded image on touch screen 310 (e.g., using camera or other imaging sensor 304) and/or control unit 302 can cause a change in the conductive pattern of the conductive protrusions 316, as described herein. In examples, control unit 302 may include a processor or processing circuitry or microcontroller circuit. In some examples, the control unit 302 can be implemented using a programmable logic device (PLD) or a field programmable gate array (FPGA).

Imaging sensor 304 (e.g., a camera) can be configured to detect an encoded image on touch screen 310. The encoded information can be displayed on the display in response to the electronic device including the touch screen identifying information about physical control device 308. In some examples, the touch screen 310 can display the encoded image at a location corresponding to the location of imaging sensor 304 based on the identification of the type of physical control device (and knowledge of the type and placement of the imaging sensor). Uplink communication 306 can represent communication from touch screen 310 to physical control device 308. Uplink communication 306 may be achieved in various ways, including through use of encoded image 312 (e.g., a quick response (QR) code). The touch screen 310 can use the encoded image to encode information and the imaging sensor 304 can capture an image of the encoded image. Control unit 302 can be used to decode the encoded image and to cause the physical control device 308 to perform an action.

Downlink communication 314 can represent communication from physical control device 308 to touch screen 310. Downlink communication 314 may be achieved in various ways, including through use of conductive protrusions 316. In some examples, the physical control device can change the conductive pattern of the conductive protrusions to convey information from the physical control device 308 to the touch screen 310. In some examples, conductive protrusions 316 can be configured to enable physical control device 308 to be identified by touch screen 310 and changes to the conductive pattern can enable operations and actions therewith. These and other features of FIG. 3A are described in greater detail hereinafter.

As noted above, physical control device 308 includes conductive protrusions 316 that are configured to provide a conductive pattern for touch screen input. In some examples, conductive protrusions 316 may be stationary. In some examples, conductive protrusions 316 may be movable. In some examples, conductive protrusions 316 may be partially movable and partially stationary. In some examples, all of conductive protrusions 316 or a first subset of conductive protrusions 316 can be configured to represent a unique pattern that identifies physical control device 308 to touch screen 310. In some examples, the conductive pattern can be achieved using a state of the conductive protrusions 316. For example, a first subset of the conductive protrusions 316 can be coupled to ground and a second subset of the conductive protrusions can be floating (e.g., using a respective switch to couple or decouple a respective conductive protrusion to the physical control device ground or not). The grounded first subset of conductive protrusions can be detected by the capacitive touch screen and can be used by the electronic device including touch screen 310 to identify physical control device 308 based on the conductive pattern of conductive protrusions 316. In some examples, the conductive pattern can be achieved using stimulation signals applied to the conductive protrusions 316. For example, the conductive protrusions 316 can be coupled to different stimulation signals including fixed voltages (e.g., DC voltage signals, ground) or alternating current waveforms (e.g., having different frequency, phase, and/or amplitude). The pattern of stimulation signals and/or pattern of characteristics of the stimulation signals can be detected by the capacitive touch screen and can be used by the electronic device including touch screen 310 to identify physical control device 308 based on the conductive pattern of conductive protrusions 316. In some examples, the conductive pattern can be achieved based on a physical pattern of the conductive protrusions 316 in contact with the touch-sensitive surface of the electronic device. For example, extension or retraction of one or more of the plurality of conductive protrusions the conductive protrusions 316 (e.g., using piezoelectric stimulation or other suitable techniques) can cause a first subset of the conductive protrusions 316 to contact the touch screen when the physical control device contacts the touch screen and thereby be detected by the touch screen, whereas a second subset of the conductive protrusions can be not in contact with the touch screen and thereby not be detected by the touch screen (or be detected hovering over the touch screen rather than in contact). The contacting first subset of conductive protrusions can be detected by the capacitive touch screen and can be used by the electronic device including touch screen 310 to identify physical control device 308 based on the conductive pattern of conductive protrusions 316.

Furthermore, as described herein, the conductive pattern can be adjusted to provide downlink input to the device including the touch screen. In some examples, the conductive pattern and conductive protrusions can be stationary (e.g., fixed voltage characteristic, fixed length, fixed ground/floating characteristic), and movement of the conductive pattern can be interpreted as input. For example, rotation of knob 102 can cause a change in position and/or orientation of the conductive pattern indicative of the amount of rotation of the knob. The position and/or orientation of the conductive pattern can be used to determine an amount of rotation of the knob as an input to the electronic device. In a similar manner, movement of sliding lever 112 along sliding track 114 can cause a change in position of the conductive pattern indicative of the amount of movement of the slider 110. The position can be used to determine an amount of translation of the slider as an input to the electronic device.

In some examples, a first subset of conductive protrusions 316 can be fixed for identification of the physical control device and a second subset of conductive protrusions 316 can be configured to be movable such that the second subset of conductive protrusions 316 can be moved in response to user input of physical control device 308 (e.g., rotation of knob 102 or translation of slider 110). The movement can create a change in a characteristic of the conductive pattern of the conductive protrusions 316 (e.g., position and/or orientation) which the capacitive touch sensor panel of touch screen 310 can detect. Processing circuitry of an electronic device including touch screen 310 can be configured to perform an action at touch screen 310 in accordance with the detected change.

In some examples, downlink information can be transmitted from the physical control device to the touch screen by changing other characteristics of the conductive pattern (e.g., without rotation or translation of a fixed conductive pattern. In some examples, the change in characteristic may include changing the conductive pattern of the plurality of conductive protrusions using different stimulation signals or using different grounding/floating states. In some examples, the change in characteristic may include changing the conductive pattern of the plurality of conductive protrusions using piezoelectric extension or retraction of one or more of the plurality of conductive protrusions. The change in stimulation signals, grounding/floating states, or extension or retraction states can encode information that can be detected and used by the electronic device including the touch screen.

As described herein, physical control device 308 and touch screen 310 can be enabled to establish a bi-directional communication link. For example, and as shown in FIG. 3A, imaging sensor 304 can be configured to detect one or more encoded images 312 on touch screen 310 to receive and decode uplink information from touch screen 310. Downlink communication 314 may be accomplished from physical control device 308 to touch screen 310 using the conductive patterns of conductive protrusions as outlined above. The uplink communications 306 may include various types of information and may cause the physical control device to take actions including: displaying an image on a display/touch screen of the physical control device (e.g., a prompt for the user to enter information such as a pin on the touch screen or a fingerprint on a fingerprint sensor), generating haptic feedback at the physical control device using haptic circuitry of the physical control device, or activating a biometric sensor (e.g., a fingerprint sensor) of the physical control device on a side of the physical control device opposite the plurality of conductive protrusions. It should be understood that the uplink communication can include other types of information (e.g., identity of the electronic device) or trigger other actions by the physical control device (e.g., audio or visual cues).

Figure 3B:
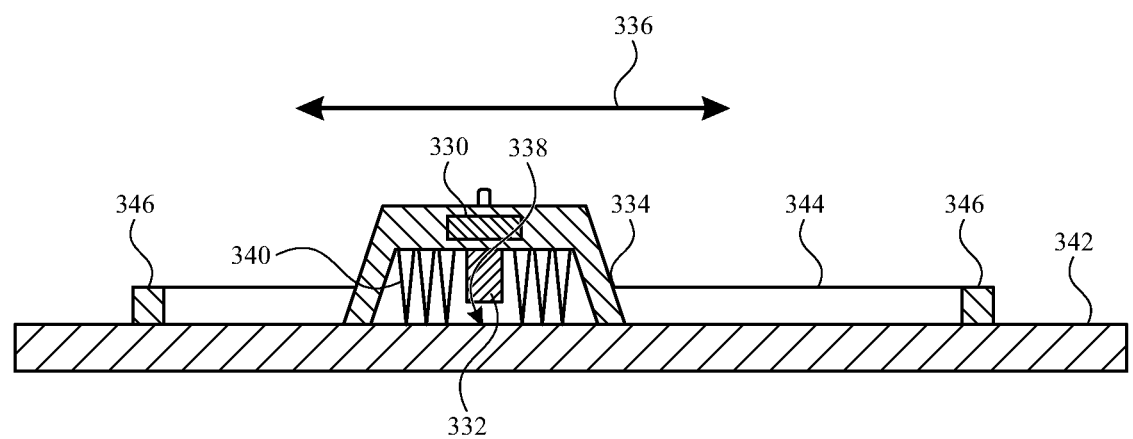
FIG. 3B illustrates a side cross-sectional view of another example physical control device coupled to a touch screen according to examples of the disclosure.

FIG. 3B illustrates a side view of another example physical control device connected to a touch screen corresponding to slider 110 of FIG. 1B. Touch screen 342 can represent an example of touch screens 204, 210 and 220 of FIGS. 2A-2C. As shown in FIG. 3B, the side view includes control unit 330 corresponding to control unit 302, imaging sensor 332 corresponding to imaging sensor 304, and conductive protrusions 340 corresponding to conductive protrusions 316. Touch screen 342 can present encoded image(s) 338 for uplink communication and the conductive pattern of conductive protrusions 340 can be used for downlink communication. These elements (e.g., the touch screen and sliding lever 334) can operate in the same or a substantially similar way to those corresponding elements described in FIG. 3A, the details of which are not repeated for brevity. Additionally, a slider physical control device can include a sliding lever 334 that can slide along a sliding track 344 as indicated by sliding axis 336. As shown in FIG. 3B, the sliding track 344 can optionally be coupled to touch screen 342 using magnets 346 (e.g., at opposite ends of sliding axis 336) or other suitable techniques (e.g., suction force, etc.). The sliding motion can move a stationary conductive pattern along sliding track 344 to provide input corresponding to the slider physical control object. Additionally, or alternatively, the conductive pattern can be changed for downlink transfer of other information.

Figure 3C:
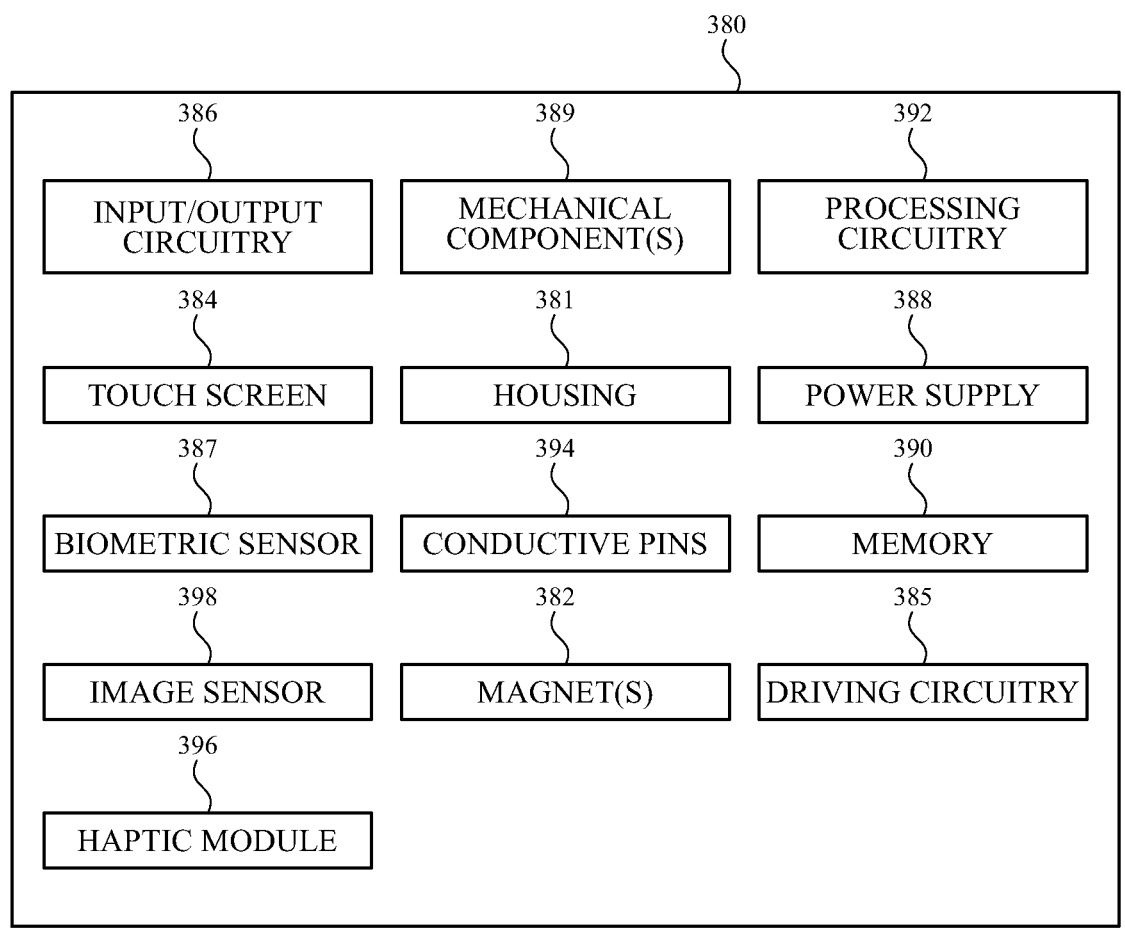
FIG. 3C illustrates an example block diagram of a physical control device according to examples of the disclosure.

FIG. 3C illustrates an example block diagram of a physical control device according to examples of the disclosure. A physical control device 380 can include a housing 381 and conductive protrusions (or pins) 394 corresponding to conductive protrusions 316 and 340. When housing 381 contacts a touch screen, some or all of conductive protrusions 394 can contact the touch screen to form a conductive pattern as described herein. In some examples, physical control device 380 can include a coupling mechanism to secure physical control device 380 to the surface of the touch screen. In some examples, the coupling mechanism can include magnets 382 that can secure the physical control device to the surface of a touch screen (e.g., the touch screen can include magnets or other ferromagnetic materials to which the magnets can be attracted). It should be understood that other coupling mechanism are possible. For example, physical control device 380 can be coupled using suction force or other fasteners to the touch screen of a device in addition to or instead of magnets 382. Physical control device 380 can also include mechanical components 389. Mechanical components 389 can be configured to provide a mechanical movement of a portion of physical control device 380 relative to another portion of physical control device 380, as described herein. For example, the mechanical components can include structures that provide for mechanical movement of knob 102 of FIG. 1A (e.g., an external portion of the housing) relative to the physical control device 380 (e.g., an internal portion of the housing coupled to the touch screen with magnet(s)). As another example, the mechanical components 389 can include structures that provide for mechanical movement of sliding lever 112 along sliding track 114.

As described herein, physical control device 380 can also include electronic circuitry in addition to conductive protrusions 394. In some examples, physical control device 380 can include a touch screen 384 (e.g., corresponding to touch screen 122), biometric sensor 387 (e.g., a fingerprint sensor corresponding to fingerprint sensor 124), or additional input devices (e.g., mechanical button(s), switch(es), microphone(s), braille input devices, keypad(s), keyboard(s), trackball(s), joystick(s), etc.) represented by input/output circuitry 386. In addition to, or as an alternative to, the movement inputs (e.g., of the knob or slider), the touch screen 384, biometric sensor 387, or additional input devices, such as a braille reader and/or audio input, can be used to provide input from the physical control device 380 to an electronic device using a touch screen. As described herein, the inputs to the touch screen 384 (e.g., a pin code), biometric sensor (e.g., a fingerprint), or other input (e.g., a state of a button or switch, audio input and/or braille inputs) can be downlink transferred to an electronic device using the touch screen of the electronic device. In some examples, the information transferred can be an indication of user authentication (e.g., based on the pin code or fingerprint). Physical control device 380 can also include image sensor 398 (e.g., corresponding to imaging sensor 304, 332) configured to sensor configured to detect an encoded image on the touch screen as described herein for uplink communication.

In some examples, physical control device 380 can include output devices such as haptic module 396. Haptic module 396 can be configured to generate haptic feedback at the physical control device for more efficient interaction therewith. In some examples, haptic feedback can provide an indication of movement of physical control device 380 (e.g., rotation or translation input of a knob or slider, respectively). As a result, the haptic feedback can be used to indicate to a user by feel an amount of input to be applied without the user needing to view the input device or touch screen for the interaction. The physical control device 380 can include additional output devices, as represented by input/output circuitry 386, such as indicator lights or speakers for visual or audio feedback, braille readers, among other possibilities.

In some examples, physical control device 380 can include a power supply 388, memory 390, processing circuitry 392 (e.g., corresponding to control unit 302, 330), and driving circuitry 385. Memory 390 can be any non-transitory computer-readable storage medium as described herein. Memory 390 can be configured to store executable instructions for processing circuitry 392 and to store information at physical control device 380 for downlink communication. Processing circuitry 392 can be configured to control input and output functionality for the electrical components of physical control device 380 described herein. For example, processing circuitry 392 can encode information in the conductive pattern presented by conductive protrusions 394 (e.g., using driving circuitry 385) and can decode encoded images received by image sensor 398. Driving circuitry 385 can be configured to drive the conductive pins with stimulation signals, to extend or retract conductive pins (e.g., using piezoelectricity), and/or to ground or float the conductive pins, as described herein. This may be accomplished in various ways including for piezoelectric function or to stimulate conductive pins 394. Biometric sensor 387 is configured to interpret an inputted biometric identifier. In some examples, processing circuitry 392 establish and enable a unidirectional (e.g., downlink) or bi-directional (downlink and uplink) communication link between the physical control device 380 and an electronic device including a touch screen. For example, as described herein, processing circuitry 392 can activate a biometric sensor 387 or display a pin request on touch screen 384 in accordance with the detected change. Power supply 388 can be configured to provide power to the electronic circuitry of physical control device 380. In some examples, the power supply is an energy storage device (e.g., a battery). In some examples, power supply 388 can be include inductive circuitry configured to receive power from the touch screen to which physical control device 380 can be coupled).

Figure 4:
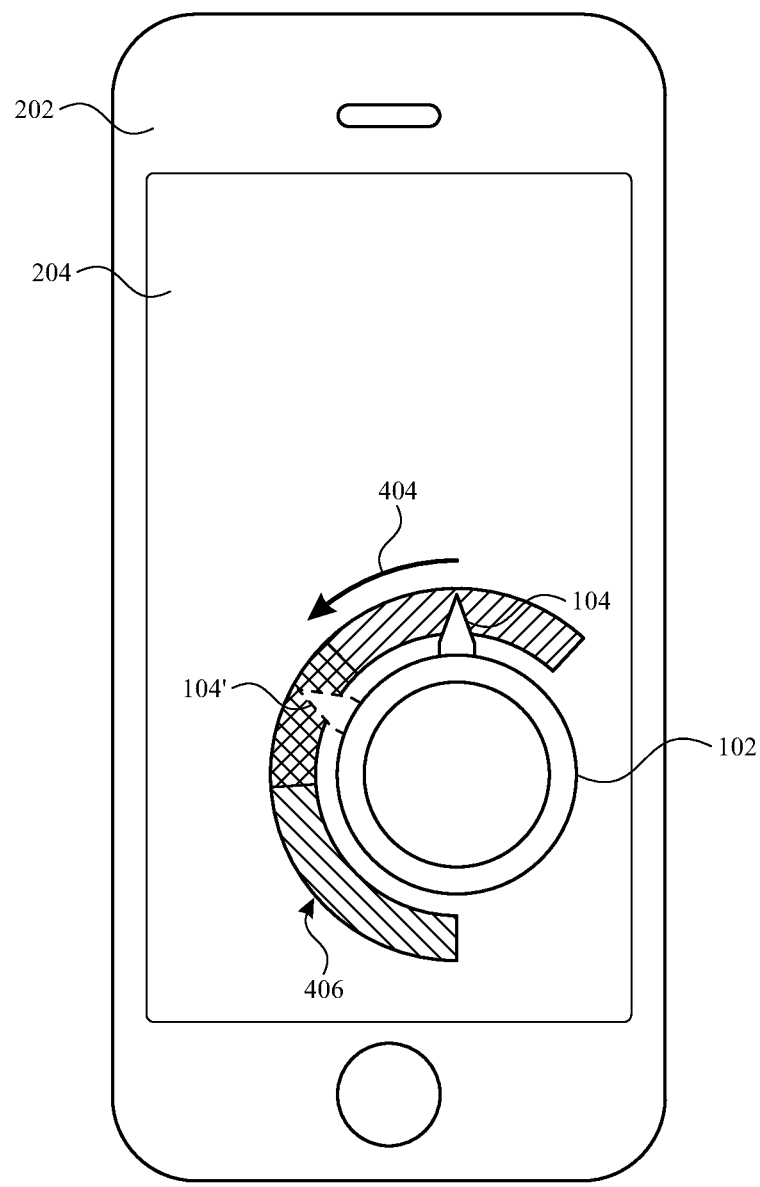
FIG. 4 illustrates a front view of an example physical control device coupled to a touch screen according to examples of the disclosure.
Figure 5:
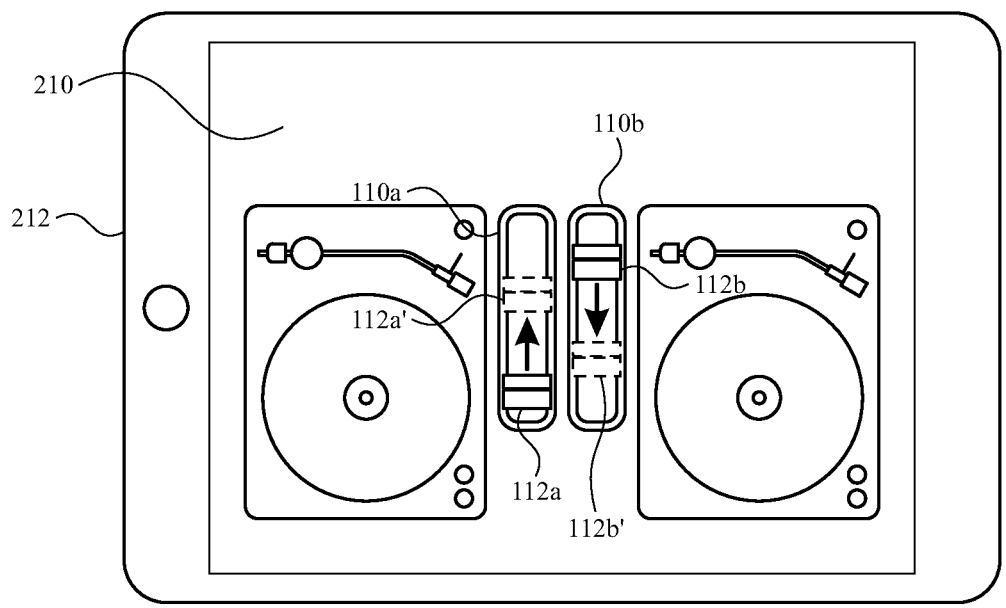
FIG. 5 illustrates a front view of example physical control devices coupled to a touch screen according to examples of the disclosure.
Figure 6:
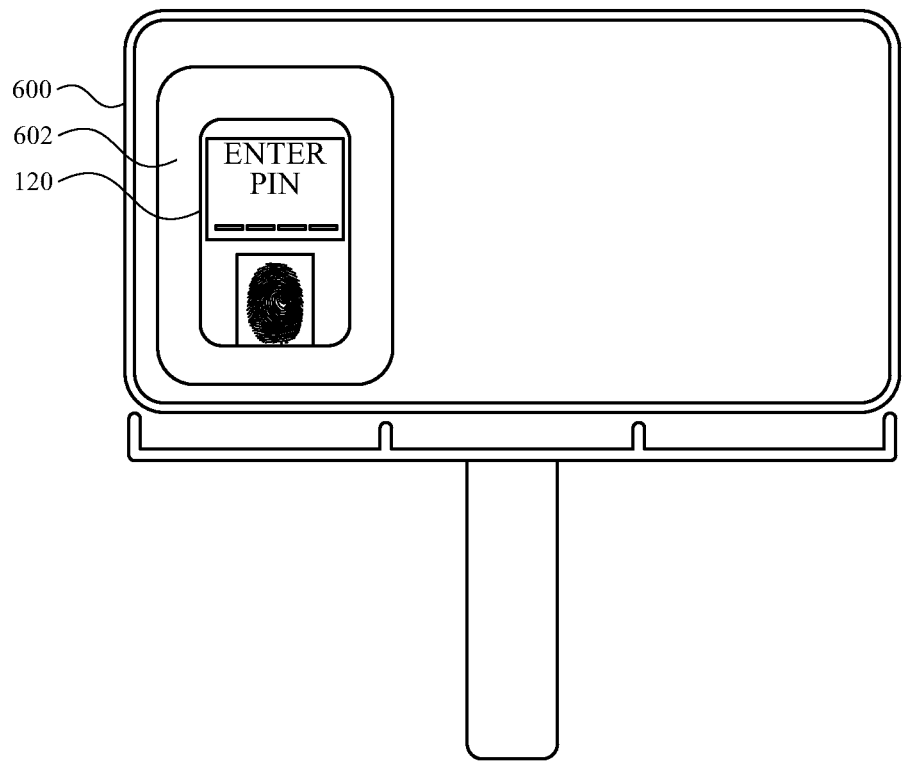
FIG. 6 illustrates a front view of an example physical control device coupled to a touch screen according to examples of the disclosure.

FIGS. 4-6 illustrates front views of example physical control devices (e.g., corresponding to physical control devices of FIGS. 1A-1C) coupled to example touch screen according to examples of the disclosure. FIG. 4 illustrates a front view of an example physical control device, knob 102 with pointer 104, connected to a touch screen 204 of electronic device 202. As shown in FIG. 4, in some examples, the touch screen user interface can display an image corresponding to the physical control device. For example, in response to identifying placement of knob 102 on touch screen 204, the user interface on touch screen 204 can display an indication of the functionality of the knob. For example, when knob 102 acts as a thermostat that controls an HVAC system the user interface can display a representation 406 of temperature range (e.g., including a minimum and maximum temperature and a color spectrum from blue to red). Pointer 104 of knob 102 is shown in solid at a first location at a first time and a pointer 104' is shown in dashed line at a second location at a second time corresponding to movement of knob 102 as indicated by rotation arrow 404. In some such examples, knob 102 can be initially positioned with pointer 104 in the first position such that the corresponding conductive protrusions can present a conductive pattern in a first orientation. After movement of knob 102 to have pointer 104' in the second position, the conductive protrusions can present the conductive pattern in a second orientation. As such, the capacitive touch sensor panel of touch screen 204 can detect the change in pattern (e.g., rotation) of the conductive protrusions, and device 202 can perform an action (e.g., adjust a target temperature) in accordance with the rotation input using knob 102. In some examples, knob 102 can be used to adjust volume of device 202 or another device controlled by device 202 using knob 102, where the user interface on touch screen 203 can display a range of volumes (e.g., max, min, and a scale therebetween).

FIG. 5 illustrates a front view of example physical control devices, sliders 110, connected to a touch screen 210 of electronic device 212. In some examples, the touch screen user interface can display an application for audio playback for a disc jockey. In some examples, the application can include controls for adjusting characteristics of playback. In some examples, sliders 110 can be coupled to the touch screen to allow for input to adjust characteristics of playback. Although not shown in FIG. 5, in some examples, the user interface can display an image corresponding to the physical control device in proximity to sliders 110. For example, in response to identifying placement of slider(s) 110 on touch screen 210, the user interface on touch screen 204 can display an indication of the functionality of the sliders alongside the slider(s) (e.g., for example to control volume, tempo, etc. for mixing of different audio channels). As shown in FIG. 5, the front view illustrates a left slider 110a with sliding lever 112a at a first location and a sliding lever 112a' representing movement of the slider control upward to a second location. The front view also illustrates a right slider 110b with sliding lever 112b at a first location and a sliding lever 112b' representing movement of the slider control downward to a second location. In this example, conductive protrusions beneath the sliding lever of each of left slider 110*a* and right slider 110*b* can present a conductive pattern of the conductive protrusions at first positions for each respective slider control. After movement of the sliders to have sliding levers 112*a*' and 112*b*' at the second positions for each respective slider control, the conductive protrusions can present the conductive pattern translated to the second positions. As such, the capacitive touch sensor panel of touch screen 210 can detect the change in pattern (e.g., translation) of the conductive protrusions, and device 212 can perform an action (e.g., adjust a volume, mixing parameters, etc.) in accordance with the sliding input using sliders 110*a*, 110*b*.

FIG. 6 illustrates a front view of an example physical control device 120 connected to a touch screen 602. As shown in FIG. 6, front view includes a device 600. Device 600 may represent a public touch screen device capable of accepting user input such as a vending machine, a ticketing machine, an ordering screen, or the like. As described herein, in some examples, physical control device 120 can accept inputs from a user to authenticate the user. In some examples, this input may be user input inputted into physical control device 120 and transferred to device 600 using touch screen 602. In some examples, the user input causes a change in the conductive pattern of the conductive protrusions that can be detected by the processing circuitry of touch screen 602, and can cause device 600 to perform an action (e.g., entering the user's corresponding pin, authenticating the user, or another action in accordance with the input).

Alternatively, or additionally, physical control device can include a biometric sensor (e.g., fingerprint sensor) and the user input may include a biometric identifier such as a user's fingerprint. In some examples, physical control device 120 may receive information from touch screen 602 to activate a biometric sensor. This information may be retrieved directly from touch screen 602 or may be obtained by scanning the encoded image displayed on touch screen 602 (e.g., using a camera sensor as described herein). In some examples, after activating the biometric sensor on physical control device 120, the user may input the biometric information to the biometric sensor (e.g., touch the finger to the fingerprint sensor to capture a fingerprint). In some examples, the fingerprint image can be transferred to device 600 using touch screen 602 by, changing the conductive protrusions of physical control device 120. In some examples, the physical control device 120 can receive and authenticate the user's biometric information, and the physical control device 120 can transfer authentication information without transferring the biometric information to improve privacy. As such, device 600 can receive the biometric identification and grant or deny access to a user via touch screen 602. Although FIG. 6 describes the physical control device in terms of a touch screen and a biometric sensor (e.g., a fingerprint sensor), it is understood that, alternatively or additionally, the physical control device can include any suitable input/output devices (e.g., a braille reader or a braille enabled input device, a microphone, a speaker, keyboard, keypad, buttons, etc.

Figure 7:
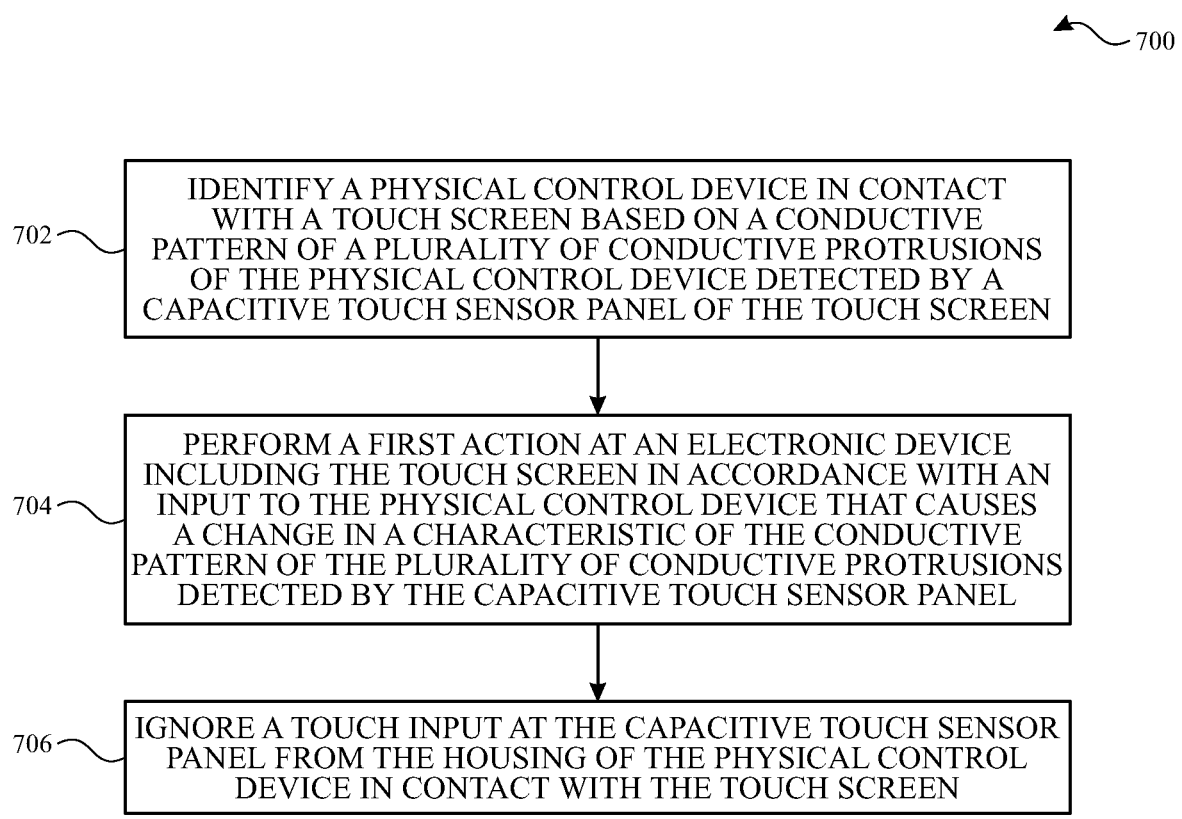
FIG. 7 illustrates a method of communicating information between a physical control device and an electronic device including a touch screen according to examples of the disclosure.

FIG. 7 illustrates a process 700 for communicating information between a physical control device and an electronic device including a touch screen according to examples of the disclosure. The physical control device can include a housing and a plurality of conductive protrusions detectable by a capacitive touch sensor panel of the touch screen when the physical control device contacts the touch screen. At 702, a physical control device in contact with a touch screen can be identified based on a conductive pattern of a plurality of conductive protrusions of the physical control device detected by a capacitive touch sensor panel of the touch screen. For example, as described with reference to FIGS. 3A-3C, a physical control device can be identified by a touch screen based on a conductive pattern of conductive protrusions (e.g., conductive protrusions 316, 340, 394). At 704, a first action can be performed at an electronic device including the touch screen in accordance with an input to the physical control device. The input to the physical control device can cause a change in a characteristic of the conductive pattern of the plurality of conductive protrusions detected by the capacitive touch sensor panel. For example, and with reference to FIGS. 3A-3C, a first action is performed at touch screen in accordance with a change in a characteristic of conductive protrusions (e.g., due to a change in grounding/floating state, a change in stimulation signals, a change in extension/retraction). At 706, a touch input can be ignored at the capacitive touch sensor panel from the housing of the physical control device in contact with the touch screen. For example, with reference to FIGS. 3A-3C, a portion of the physical control device housing can contact the touch screen independent from the conductive protrusions. A touch input from the portion of the physical control device housing can be ignored at the touch screen.

Although primarily described herein in terms of a capacitive touch screen, a physical control device including conductive protrusions, and using different conductive patterns and/or movement of conductive patterns for downlink communications therebetween, it is understood that the disclosure is not so limited. In some examples, other touch screen technologies can be used other than capacitive touch screens and/or a control device with non-conducive protrusions can be used. For example, a force-sensitive touch screen that relies on force sensors (e.g., strain gauges, piezoelectric force sensors, or other force sensors) can be used with a physical control device to detect a pattern off non-conductive (or conductive) protrusions, which may be adjustable by expanding/retracting respective protrusions (or using other suitable techniques described herein to adjust the pattern) to enable downlink communication.

Therefore, according to the above, some examples of the disclosure can be directed to a physical control device comprising: a housing configured to be coupled to a touch sensitive surface of an electronic device; and a plurality of conductive protrusions. The plurality of conductive protrusions can be detectable by a capacitive touch sensor panel of the touch sensitive surface when the housing contacts the touch sensitive surface. A conductive pattern of the plurality of conductive protrusions can be configurable using movement of one or more of the plurality of conductive protrusions while the housing remains stationary on the touch sensitive surface. Additionally, or alternatively, in some examples, the physical control device comprises an image sensor configured to detect an encoded image on a display of the electronic device to identify information about the electronic device. Additionally or alternatively, the conductive pattern is unique to the physical control device. Additionally, or alternatively, the physical control device can further comprise processing circuitry configured to establish a communication link (e.g., unidirectional or bi-directional) between the physical control device and the electronic device. Additionally or alternatively, an input to the physical control device causes a change in a characteristic of the conductive pattern, the change comprising a movement of the conductive pattern to a different location on the touch sensitive surface, changing the conductive pattern of the plurality of conductive protrusions using different stimulation signals, or changing the conductive pattern of the plurality of conductive protrusions using piezoelectric extension or piezoelectric retraction of one or more of the plurality of conductive protrusions. Additionally, or alternatively, the physical control device can comprise one of: a turning knob; a slider; a fingerprint sensor device; or an input touch screen. Additionally, or alternatively, the physical control device can further comprise processing circuitry configured to cause the physical control device to perform a second action in accordance with detecting an encoded image on the touch sensitive surface. Additionally or alternatively, the second action can comprise displaying an image on a display of the physical control device, generating haptic feedback at the physical control device using haptic circuitry of the physical control device, or activating a biometric sensor of the physical control device on a side of the physical control device opposite the plurality of conductive protrusions.

Some examples of the disclosure are directed to an electronic device. The electronic device can comprise a touch screen having a capacitive touch sensor panel configured to simultaneously detect multiple objects in contact with the touch screen and processing circuitry coupled to the touch screen. The processing circuitry can be configured to identify a physical control device in contact with the touch screen. The physical control device can include a housing that can come in contact with the touch screen and a plurality of conductive protrusions that can come in contact with the touch screen when the physical control device is in contact with the touch screen. Identifying the physical control device can be based on a conductive pattern of the plurality of conductive protrusions detected by the capacitive touch sensor panel. The processing circuitry can be further configured to perform an action at the electronic device in accordance with an input to the physical control device that causes a change in a characteristic of the conductive pattern of the plurality of conductive protrusions detected by the capacitive touch sensor panel. The processing circuitry can be further configured to ignore a touch input at the touch screen from the housing of the physical control device in contact with the touch screen. Additionally, or alternatively, the touch screen can be further configured to display an encoded image at a location that corresponds to an image sensor of the physical control device in accordance with identifying the physical control device. Additionally, or alternatively, the conductive pattern can be unique to the physical control device. Additionally, or alternatively, the processing circuitry can be further configured to establish a bi-directional communication link between the physical control device and the electronic device. Additionally or alternatively, the change in the characteristic can comprise movement of the conductive pattern to a different location on the touch screen, changing the conductive pattern of the plurality of conductive protrusions using different stimulation signals, or changing the conductive pattern of the plurality of conductive protrusions using piezoelectric extension or piezoelectric retraction of one or more of the plurality of conductive protrusions. Additionally, or alternatively, the physical control device can come in contact with the touch screen using suction or magnetic force.

Some examples of the disclosure are directed to a method of communicating information between a physical control device and an electronic device including a touch screen. The physical control device can have a housing and a plurality of conductive protrusions detectable by a capacitive touch sensor panel of the touch screen when the physical control device contacts the touch screen. The method can comprise: identifying, using processing circuitry of the electronic device, the physical control device in contact with the touch screen based on a conductive pattern of the plurality of conductive protrusions detected by the capacitive touch sensor panel; performing a first action at the electronic device in accordance with an input to the physical control device that causes a change in a characteristic of the conductive pattern of the plurality of conductive protrusions detected by the capacitive touch sensor panel; and ignoring a touch input at the capacitive touch sensor panel from the housing of the physical control device in contact with the touch screen. Additionally or alternatively the method can further include displaying an encoded image on the touch screen at a location corresponding to an image sensor of the physical control device in accordance with identifying the physical control device. Additionally, or alternatively, the method can further include causing the physical control device to perform a second action in accordance with detecting the encoded image on the touch screen. Additionally, or alternatively, the second action can comprise changing display of a display of the physical control device, generating haptic feedback at the physical control device, or activating a sensor on a side of the physical control device opposite the plurality of conductive protrusions. Additionally, or alternatively, the conductive pattern can be unique to the physical control device. Additionally, or alternatively, the method can further include, in response to the identifying, establishing a bi-directional communication link between the physical control device and the electronic device. Additionally or alternatively, the change in the characteristic can comprise movement of the conductive pattern to a different location on the touch screen, changing the conductive pattern of the plurality of conductive protrusions using different stimulation signals, or changing the conductive pattern of the plurality of conductive protrusions using piezoelectric extension or piezoelectric retraction of one or more of the plurality of conductive protrusions. Additionally, or alternatively, the physical control device can comprise one of a turning knob; a slider; a fingerprint sensor device; or an input touch screen. Additionally, or alternatively, the physical control device can be coupled to the touch screen using suction or magnetic force.

Some examples of the disclosure are directed to a physical control device. The physical control device can comprise a housing configured to be coupled to a touch sensitive surface and a plurality of protrusions, the plurality of protrusions detectable by a touch sensor panel of the touch sensitive surface when the housing contacts the touch sensitive surface. A pattern of the plurality of protrusions identifies the physical control device and an input to the physical control device can cause a change in a characteristic of the pattern of the plurality of protrusions.

Some examples of the disclosure are directed to an electronic device. The electronic device can comprise a touch screen having a touch sensor panel configured to simultaneously detect multiple objects in contact with the touch screen. The electronic device can further comprise processing circuitry coupled to the touch screen and configured to identify a physical control device in contact with the touch screen. The physical control device can include a housing that comes in contact with the touch screen and a plurality of protrusions that come in contact with the touch screen when the physical control device is in contact with the touch screen. Identifying the physical control device can be based on a pattern of the plurality of protrusions detected by the touch sensor panel. The processing circuitry can be further configured to perform an action at the electronic device in accordance with an input to the physical control device that causes a change in a characteristic of the pattern of the plurality of protrusions detected by the touch sensor panel, and ignore a touch input at the touch screen from the housing of the physical control device in contact with the touch screen.

Some examples of the disclosure are directed to a method of communicating information between a physical control device and an electronic device including a touch screen. The physical control device can have a housing and a plurality of protrusions detectable by a touch sensor panel of the touch screen when the physical control device contacts the touch screen. The method can comprise identifying, using processing circuitry of the electronic device, the physical control device in contact with the touch screen based on a pattern of the plurality of protrusions detected by the touch sensor panel, performing a first action at the electronic device in accordance with an input to the physical control device that causes a change in a characteristic of the pattern of the plurality of protrusions detected by the touch sensor panel, and ignoring a touch input at the touch sensor panel from the housing of the physical control device in contact with the touch screen.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A physical control device comprising:
   a housing configured to be coupled to a touch sensitive surface of an electronic device; and
   a plurality of conductive protrusions, the plurality of conductive protrusions detectable by a capacitive touch sensor panel of the touch sensitive surface when the housing contacts the touch sensitive surface, wherein a conductive pattern of the plurality of conductive protrusions is configured to be moved while the housing remains stationary on the touch sensitive surface,
   wherein the physical control device further comprises a control unit configured to establish a bi-directional communication link between the physical control device and the electronic device.

2. The physical control device of claim 1, further comprising:
   an image sensor configured to detect an encoded image on a display of the electronic device to identify information about the physical control device.

3. The physical control device of claim 1, wherein the conductive pattern is unique to the physical control device.

4. The physical control device of claim 1, wherein an input to the physical control device causes a change in a characteristic of the conductive pattern, the change comprising changing the conductive pattern of the plurality of conductive protrusions using different stimulation signals or changing the conductive pattern of the plurality of conductive protrusions using a piezoelectric extension or a piezoelectric retraction of one or more of the plurality of conductive protrusions.

5. The physical control device of claim 1, wherein the physical control device comprises one of:
   a turning knob;
   a slider;
   a fingerprint sensor device; or
   an input touch screen.

6. The physical control device of claim 1, wherein the physical control device further comprises:
   processing circuitry configured to cause the physical control device to perform a second action in accordance with detecting an encoded image on a touch screen the touch sensitive surface.

7. The physical control device of claim 6, wherein the second action comprises displaying an image on a display of the physical control device, generating haptic feedback at the physical control device using haptic circuitry of the physical control device, or activating a biometric sensor of the physical control device on a side of the physical control device opposite the plurality of conductive protrusions.

8. An electronic device comprising:
   a touch screen having a capacitive touch sensor panel configured to simultaneously detect multiple objects in contact with the touch screen; and
   processing circuitry coupled to the touch screen and configured to:
      identify a physical control device in contact with the touch screen, the physical control device including a housing that comes in contact with the touch screen and a plurality of conductive protrusions that come in contact with the touch screen when the physical control device is in contact with the touch screen, wherein identifying the physical control device is based on a conductive pattern of the plurality of conductive protrusions detected by the capacitive touch sensor panel;
      display an encoded image on the touch screen at a location that corresponds to an image sensor included in the physical control device in accordance with identifying the physical control device;
      perform an action at the electronic device in accordance with an input to the physical control device that causes a change in a characteristic of the conductive pattern of the plurality of conductive protrusions detected by the capacitive touch sensor panel; and
      ignore a touch input at the touch screen from the housing of the physical control device in contact with the touch screen.

9. The electronic device of claim 8, wherein the conductive pattern is unique to the physical control device.

10. The electronic device of claim 8, wherein the processing circuitry is further configured to establish a bi-directional communication link between the physical control device and the electronic device.

11. The electronic device of claim 8, wherein the change in the characteristic comprises movement of the conductive pattern to a different location on the touch screen, a change in the conductive pattern of the plurality of conductive protrusions based on detection of different stimulation signals, or a change in the conductive pattern of the plurality of conductive protrusions based on an extension or a retraction of one or more of the plurality of conductive protrusions.

12. The electronic device of claim 8, wherein the physical control device comes in contact with the touch screen using suction or magnetic force.

13. A method of communicating information between a physical control device and an electronic device including a touch screen, the physical control device having a housing and a plurality of conductive protrusions detectable by a capacitive touch sensor panel of the touch screen when the physical control device contacts the touch screen, the method comprising:
   identifying, using processing circuitry of the electronic device, the physical control device in contact with the touch screen based on a conductive pattern of the plurality of conductive protrusions detected by the capacitive touch sensor panel;

in response to the identifying, establishing a bi-directional communication link between a control unit of the physical control device and the electronic device;

performing a first action at the electronic device in accordance with an input to the physical control device that causes a change in a characteristic of the conductive pattern of the plurality of conductive protrusions detected by the capacitive touch sensor panel; and ignoring a touch input at the capacitive touch sensor panel from the housing of the physical control device in contact with the touch screen.

14. The method of claim 13, further comprising:
displaying an encoded image on the touch screen at a location corresponding to an image sensor of the physical control device in accordance with identifying the physical control device.

15. The method of claim 14, further comprising:
causing the physical control device to perform a second action in accordance with detecting the encoded image on the touch screen.

16. The method of claim 15, wherein the second action comprises changing display of a display of the physical control device, generating haptic feedback at the physical control device, or activating a sensor on a side of the physical control device opposite the plurality of conductive protrusions.

17. The method of claim 13, wherein the conductive pattern is unique to the physical control device.

18. The method of claim 13, wherein the change in the characteristic comprises movement of the conductive pattern to a different location on the touch screen, a change in the conductive pattern of the plurality of conductive protrusions based on different stimulation signals, or a change in the conductive pattern of the plurality of conductive protrusions based on piezoelectric extension or piezoelectric retraction of one or more of the plurality of conductive protrusions.

19. The method of claim 13, wherein the physical control device comprises one of:
a turning knob;
a slider;
a fingerprint sensor device; or
an input touch screen.

20. The method of claim 13, wherein the physical control device is coupled to the touch screen using suction or magnetic force.

21. The method of claim 13, wherein the input to the physical control device comprises a touch input on a touch screen of the physical control device.

22. The method of claim 13, wherein the input to the physical control device comprises a fingerprint input on a fingerprint sensor of the physical control device.

* * * * *